US008056017B2

(12) United States Patent
Wiese

(10) Patent No.: US 8,056,017 B2
(45) Date of Patent: Nov. 8, 2011

(54) REAL ESTATE VALUE MAP COMPUTER SYSTEM

(75) Inventor: Steven Paul Wiese, Farmington, MI (US)

(73) Assignee: Vepse Technology Co., L.L.C., Wilmington, DE (US)

( * ) Notice: Subject to any disclaimer, the term of this patent is extended or adjusted under 35 U.S.C. 154(b) by 505 days.

(21) Appl. No.: 12/367,340

(22) Filed: Feb. 6, 2009

(65) Prior Publication Data

US 2009/0144177 A1 Jun. 4, 2009

Related U.S. Application Data

(63) Continuation of application No. 10/044,583, filed on Nov. 9, 2001, which is a continuation-in-part of application No. 09/286,922, filed on Apr. 6, 1999, now Pat. No. 6,323,885.

(60) Provisional application No. 60/100,831, filed on Sep. 18, 1998.

(51) Int. Cl.
*G06F 3/048* (2006.01)
(52) U.S. Cl. ........ 715/835; 715/764; 715/810; 340/990; 340/995
(58) Field of Classification Search .................. 715/835, 715/764, 810, 962; 340/990, 995
See application file for complete search history.

(56) References Cited

U.S. PATENT DOCUMENTS

| | | | |
|---|---|---|---|
| 4,870,576 A | 9/1989 | Tornetta | |
| 5,032,989 A | 7/1991 | Tornetta | |
| 5,559,707 A | 9/1996 | DeLorme et al. | |
| 5,731,997 A | 3/1998 | Manson et al. | |
| 5,736,977 A | 4/1998 | Hughes | |
| 5,781,773 A | 7/1998 | Vanderpool et al. | |
| 5,794,216 A | 8/1998 | Brown | |
| 5,852,810 A | 12/1998 | Sotiroff et al. | |
| 5,991,769 A | 11/1999 | Fino et al. | |
| 6,219,053 B1 | 4/2001 | Tachibana et al. | |
| 6,748,318 B1 | 6/2004 | Jones | |

OTHER PUBLICATIONS

Jade Goldstein, et al., "Using Aggregation and Dynamic Queries for Exploring Large Data Sets", Proceedings of the SIGCHI Conference on Human Factors in Computing Systems: Celebrating Interdependence, pp. 23-29, 1994.
Steven F. Roth, et al., "Interactive Graphic Design Using Automatic Presentation Knowledge", Proceedings of the CHI Conference 1994, 7 pages.
Mark Derthick, et al., "An Interactive Visual Query Environment for Exploring Data", Proceedings of the 10th annual ACM symposium on User interface Software and Technology, pp. 189-198, 1997.
Vibhu O. Mittal, et al., "Describing Complex Charts in Natural Language: A Caption Generation System"; Association for Computational Linguistics, 1998, 38 pages.
Scott Robertson, et al., "Dual Device User Interface Design: PDAs and Interactive Television", Proceedings of the SIGCHI conference on Human factors in computing systems: common ground CHI '96, Apr. 1996, 8 pages.

(Continued)

*Primary Examiner* — Tadeese Hailu
(74) *Attorney, Agent, or Firm* — Turocy & Watson, LLP

(57) ABSTRACT

A computer system creates and displays a map image based upon a value database associating a plurality of values each with a geographic location in a geographic area and a map program associating each location with a map image location. The computer system assigns one of a plurality of symbols to each geographic location based upon its associated value. The symbol is then displayed on the map image at the map image location associated with the geographic location.

20 Claims, 3 Drawing Sheets

OTHER PUBLICATIONS

Christopher Williamson, et al., "The Dynamic HomeFinder: Evaluating Dynamic Queries in a Real-Estate Information Exploration System", Proceedings of the 15th annual international ACM SIGIR conference on Research and development in information retrieval SIGIR '92, Jun. 1992, 9 pages.

Sharon Oviatt, "Multimodal Interfaces for Dynamic Interactive Maps", Proceedings of the SIGCHI conference on Human factors in computing systems: common ground CHI '96, Apr. 1996, 8 pages.

Christopher Ahlberg, et al., "Visual Information Seeking: Tight Coupling of Dynamic Query Filters with Starfield Displays", Proceedings of the SIGCHI conference on Human factors in computing systems: celebrating interdependence CHI '94, Apr. 1994, 7 pages.

Office Action dated Oct. 19, 2010 for U.S. Appl. No. 10/044,583, 22 pages.

Office Action dated Apr. 29, 2011 for U.S. Appl. No. 10/044,583, 7 pages.

HOME VALUE MAP

BY SOUTHEASTERN APPRAISAL CORP.

IN ORDER TO DOWNLOAD THE MAPS, PLEASE CLICK ON THE LEFT HAND SIDE OF THE TABLES BELOW, FOR THE AREA YOU INTERESTED IN.

YOU MUST HAVE A COLOR PRINTER.
USE BEST PRINT QUALITY SELECTIONS.

SELECT YOUR MAPS:

| OAKLAND COUNTY: | CITIES: |
|---|---|
| 100a — ADDISON | ADDISON |
| 100b — BIRMINGHAM | BIRMINGHAM |
| 100c — BLOOMFIELD HILLS | BLOOMFIELD HILLS |
| COMMERCE TOWNSHIP | COMMERCE TOWNSHIP |
| FARMINGTON HILLS | FARMINGTON HILLS, FARMINGTON |
| GROVELAND | GROVELAND |
| HIGHLAND | HIGHLAND |
| HOLLY | HOLLY |
| INDEPENDANCE TOWNSHIP | INDEPENDANCE TOWNSHIP |
| SOUTH LYON | SOUTH LYON |
| MILFORD | MILFORD |
| NOVI | NOVI |
| OAKLAND | OAKLAND |
| ORION | ORION |
| ORTONVILLE | ORTONVILLE |
| OXFORD | OXFORD |
| PONTIAC | PONTIAC |
| ROCHESTER HILLS | ROCHESTER HILLS |
| ROSEVILLE | ROSEVILLE |
| ROYAL OAK | ROYAL OAK |
| SPRINGFIELD | SPRINGFIELD |
| SOUTHFIELD | SOUTHFIELD |
| TROY | TROY |
| WEST BLOOMFIELD | WEST BLOOMFIELD |
| WATERFORD | WATERFORD |

Fig-3

REAL ESTATE VALUE MAP COMPUTER SYSTEM

CROSS-REFERENCE TO RELATED APPLICATIONS

This application is a continuation application of pending U.S. patent application Ser. No. 10/044,583, filed 9 Nov. 2001 and entitled "REAL ESTATE VALUE MAP COMPUTER SYSTEM", which is a CIP of U.S. patent application Ser. No. 09/286,922, filed 6 Apr. 1999 and entitled "REAL ESTATE VALUE MAP COMPUTER SYSTEM", which matured into U.S. Pat. No. 6,323,885 on 27 Nov. 2001 under the same title, which claims the benefit of U.S. Provisional Application No. 60/100,831 filed 18 Sep. 1998. The entirety of the aforementioned application(s) and patent(s) are incorporated herein by reference.

BACKGROUND OF THE INVENTION

The present invention relates generally to computer systems and more particularly to a computer system for creating and providing a map image of real estate values.

Currently, data indicating sale prices of homes or other real estate is available from several on-line sources. This data is typically displayed in text format, wherein each entry displays the address, sales price, sales date, etc. Although these databases provide information to potential home buyers regarding sale prices in selected areas, the textual display of such information is inefficient. Further, the textual display does not provide the observer with an indication of how sale prices vary generally across geographic areas.

SUMMARY OF THE INVENTION

The present invention provides a method and computer system for creating and displaying a map image including symbols which quickly and efficiently convey information regarding real estate values in numerous geographic locations in a selected geographic area simultaneously.

Preferably, the computer system of the present invention includes a database including a sale price for each of a plurality of real estate parcels in selected geographic areas. The computer system further includes a map program which associates each of the plurality of real estate parcels to a map image location. The computer system associates each of a plurality of symbols with a range of sales prices. Preferably each symbol includes a color and a shape. Each color is associated with a different range of sales prices. Each range is further divided in to subranges, with each shape within each color associated with one of the sub-ranges. Thus, the color of a symbol indicates the range of sales prices, while the shape further defines the sub-range of sales prices.

The computer associates one of the plurality of symbols with each of the real estate parcels based upon the sales price from the value database. Each symbol is then displayed on a map image based upon the association between the real estate parcel and the map image location.

The resulting map image of the geographic area includes the plurality of symbols displayed on the map image at locations corresponding to the real estate parcels. Each symbol indicates the sale price (within the sub-range) of the real estate parcel with which it is associated.

Since each range of real estate prices is associated with a color, an observer can quickly perceive larger variations in real estate values by observing differences in color between different geographic locations. By looking further, the observer can discriminate smaller variations in real estate values indicated by the different shapes of the symbols.

Preferably, the computer system is implemented on a network, such as the Internet. The computer system provides a user with the ability to select a geographic area. Upon selection of the geographic area, the computer system displays a map image with the symbols as described above for that area. Preferably, an advertisement associated with the selected geographic area is also displayed either alongside of the map image or in a display screen prior to the map image. The advertisement would ideally be for a realtor or mortgage broker or other service or product related to the purchase and sale of homes or other real estate.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which:

FIG. 3 illustrates a second display screen of the display of FIG. 1; and

DETAILED DESCRIPTION OF THE PREFERRED EMBODIMENT

Figure 1:
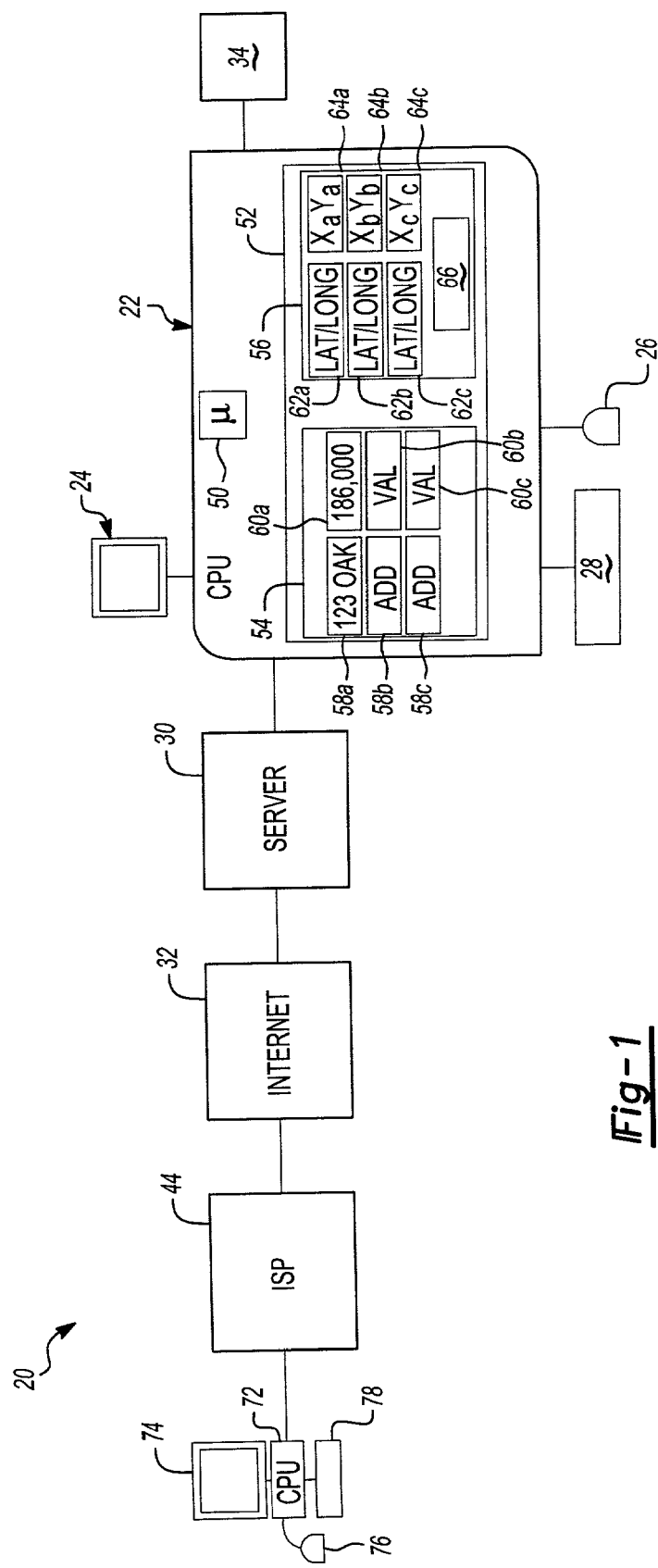
FIG. 1 is a schematic of the computer system of the present invention.

The present invention provides a computer system 20 for creating and providing a map image according to a method of the present invention. The computer system 20 includes first CPU 22 for creating the map image in a manner which will be discussed below. The first CPU 22 includes a display 24 and input devices, such as a mouse 26 and/or keyboard 28. The first CPU 22 may be connected to a server 30 capable of operating a web site on a network, such as the Internet 32. The first CPU 22 is also connected to a color printer 34. Alternatively, the first CPU 22 may comprise the server 30.

The first CPU 22 includes a microprocessor 50 accessing computer memory 52, such as a hard drive, RAM, CD ROM, ROM, etc. The computer memory 52 stores a value database 54 and a map program 56. The value database 54 associates each of a plurality of geographic locations 58a-c with each of a plurality of values 60a-c, respectively. The geographic locations 58 preferably comprise street addresses, real estate parcel identification numbers, tax identification numbers, latitude/longitude or other unique identifiers for the geographic locations. Each value 60 preferably comprises a number representing a sale price of the associated geographic location 58. Alternatively, each value 60 could represent an appraised price, rental value or other value associated with the geographic location 58.

The value database 54 is available from real estate listings, such as the Multiple Listing Services, local municipalities, TransAmerica or other sources. Generally, the map program 56 associates the geographic locations 58 with coordinates 64a-c on a digital street map image 66. There are many ways to implement the map program 56; however, suitable map programs 56 are available from Arcview with suitable databases and street map images 66 from ETAK or Geographic Data Technology. If the geographic location 58 is in the form of a street address, the map program 56 may first convert it to latitude/longitude information 62a-c in order to associate it with the street map image 66. Other known programs can directly associate street address information to coordinates on the street map image 66.

Information stored on the server 30 is available to users via the Internet 32 utilizing a CPU 72 including a display 74 and input devices, such as a mouse 76 and/or a keyboard 78. The microprocessor 50 of the first CPU 22 is programmed with suitable software to perform the functions described herein, as are the server 30, CPU 72 and ISP 44.

Figure 2:
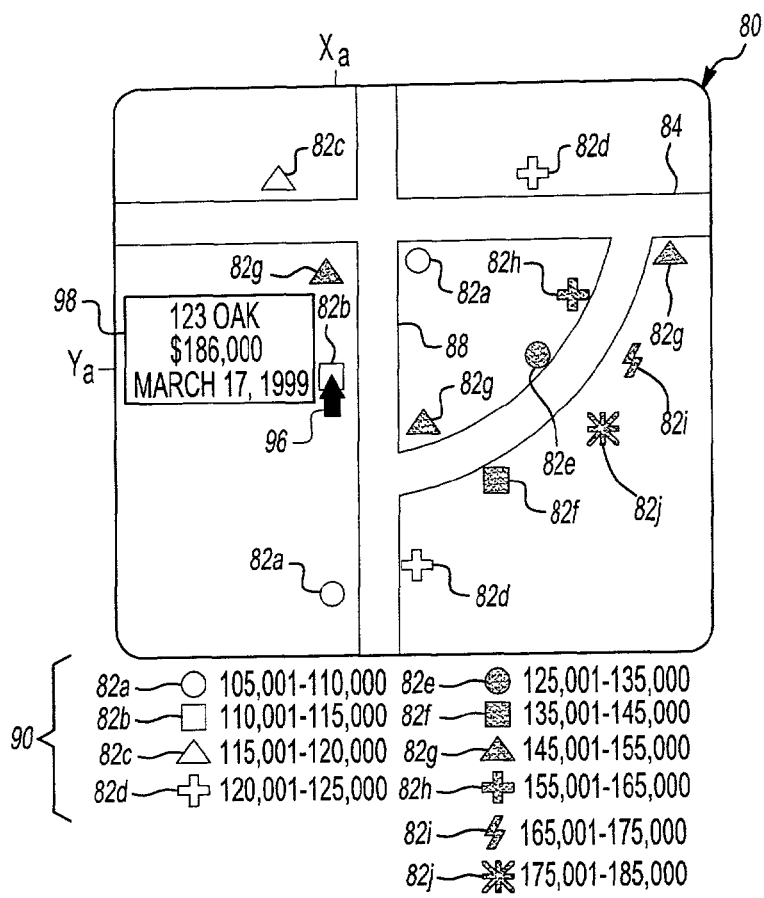
FIG. 2 illustrates a first display screen of the display of FIG. 1.

The first CPU 22 is programmed to create a map image 80 shown in FIG. 2. The map image 80 includes a plurality of symbols 82a-h displayed around a plurality of streets 84, 86 and 88 from the digital street map image 66 (FIG. 1). Each of the symbols 82 is associated with a sub-range of values. The location of the symbol 82 on the map image 80 corresponds to a geographic location. The symbol 82 displayed indicates the value of the geographic location at which the symbol 82 is displayed. A legend 90 is preferably displayed adjacent the map image 80. As can be seen in FIG. 2, the symbols 82 include a plurality of shapes, each displayed in one of a plurality of colors. Although only four shapes and two colors are shown in FIG. 2, preferably at least eight shapes and at least five colors are utilized. Colors and shapes could be constant across all geographic areas or alternatively, colors and shapes could be assigned to ranges and subranges based upon the range of values in the geographic area. The size of each range and subrange could also vary based upon the values in the geographic area displayed. One of reasonable skill in the art and familiar with computers could select appropriate colors.

Each color is associated with a range of values. For example, in FIG. 2, the white symbols 82a-d are associated with values between $170,001 to $210,000 and the black symbols 82e-h are associated with the values of $210,001 and above. Within each color, the ranges of value are broken into sub-ranges, each associated with a shape. For example, the white circle symbol 82a is associated with values between $170,001 to $180,000, the white square symbol 82b is associated with values from $180,001 to $190,000 and so on as shown in the legend 90 of FIG. 2.

Thus, an observer of the map image 80 of FIG. 2 quickly and efficiently ascertains general trends in values based upon colors in certain areas on the map image 80, which includes a certain geographic area. After discerning general trends (if any) between geographic location and values, a user can discern values more specifically, i.e., into the sub-ranges, by observing the specific shapes of the symbols 82 within each color.

It should be noted that the map image 80 (and legend 90) could be displayed on a computer display, such as the computer displays 24, 74 of FIG. 1 or printed on paper, such as by the printer 34 of FIG. 1. If the map image 80 is displayed on a computer display, a user could select additional information about any of the geographic locations associated with a symbol 82. For example, by moving a cursor 96 over the symbol 82b, a pop-up display 98 appears adjacent the symbol 82b, indicating additional information regarding the geographic location associated with symbol 82b, such as street address, exact value and/or date of the sale. Although a very small geographic area is shown in map image 80 of FIG. 2, preferably, the user can selectively change the scale of the map image 80 and select different geographic areas in a manner similar to known computer map display programs.

The map image 80 of FIG. 2 is created by the first CPU 22 of FIG. 1. The method of creating the map image 80 of the present invention will be described with respect to FIGS. 1 and 2. The first CPU 22 associates each of the plurality of symbols 82a-h with a sub-range of values, associating each color with a range and each shape within each color with a sub-range, generally as shown in the legend 90 of FIG. 2.

Although each of the sub-ranges could be equal, the sub-ranges of the symbols at the higher value colors are preferably larger. As shown in FIG. 2, the symbols 82a-d for a first color each cover a $5,000 sub-range, while the symbols 82e-j for a second color each cover a $10,000 sub-range. Additionally, or alternatively, there could be a greater number of symbols for the higher value colors than the lower value colors. As shown in FIG. 2, the second color (range) includes more symbols 82e-82j than the first color (range). Again, the number of symbols or the size of the sub-ranges can each be varied, or both.

The CPU 22 then reads the value database 54 and associates one of the plurality of symbols 82 with each street address 58 in the value database 54. Each symbol 82 may be used for more than one coordinate 64, as more than one real estate parcel falls within the associated sub-range. The map program 56 and the CPU 22 then convert or correlate the street addresses 58 to latitude/longitude information 62. The latitude/longitude information 62 is then converted or correlated to coordinates 64 on the computer street image 66. Alternatively, the CPU 22 and map program 56 may directly convert or correlate the street addresses 58 to the coordinates 64. Alternatively, the geographic locations 58 may be latitude/longitude information 62.

Thus, street address 58a is associated with value 60a, latitude/longitude information 62a and coordinate 64a. Likewise, street address 58b, value 60b, latitude/longitude information 62b and coordinates 64b are also associated, and so on. The CPU 22 then generates the map image 80, displaying the street image 66 with the symbols 82 displayed at their associated coordinates 64 on the street image 66, as shown in FIG. 2.

For example, street address 58a ("123 Oak") is associated with a value 60a of $186,000. Thus, CPU 22 associates symbol 82b ($180,001-190,000) with street address 58a. CPU 22 also determines that symbol 82b should be displayed at coordinates $x_a, y_b$. This is demonstrated in FIGS. 1 and 2. Coordinates $x_a, y_b$ on street image 66 correspond to the proper geographic location on the map image 80 relative to the streets 84, 86, 88.

Figure 4:
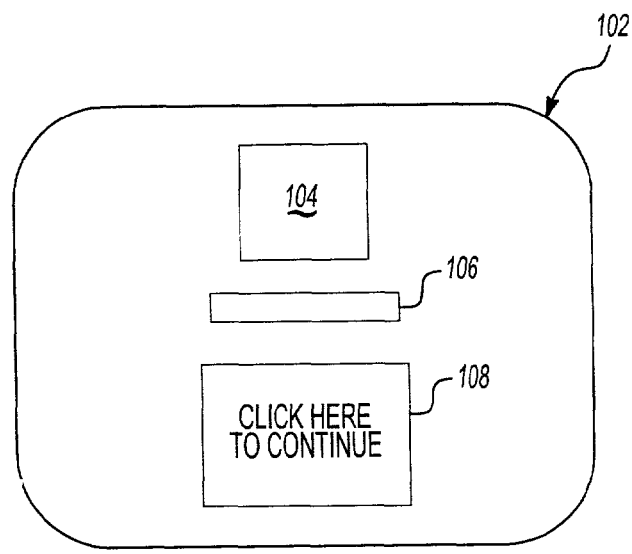
FIG. 4 illustrates a third display screen of the display of FIG. 1.

When a user accesses the server 30 of Internet 32, the user of CPU 72 is first presented with one or more geographic area selection screens, such as shown in FIG. 3, on display 74. The geographic area selection screen displays a plurality of geographic areas 100a-c, each associated with a map image, including map image 80 of FIG. 2. Upon selection of a geographic area 100 from the display in FIG. 3, an advertisement screen 102, such as that shown in FIG. 4, is preferably displayed on the user's display 74. The advertisement screen 102 includes an ad 104 and/or Internet link 106. Preferably, the ad 104 and/or link 106 is for a product and/or service related to the associated geographic area 100 (FIG. 3). Most preferably, the ad 104 and/or link 106 is also related to the purchase, sale or ownership of real estate, such as realtors, mortgage brokers, etc. The ad screen also includes a link 108 to the map image screen shown in FIG. 2. Alternatively, the user could enter a starting address on the user's CPU 22 to select a geographic area in a manner similar to known computer map and driving instruction programs.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A method of operating a computer server, comprising:
accessing at least one value within a value database, the at least one value associated with at least one geographic location, in response to receiving a data input, the data input including at least a request for information associated with a first geographic area that includes the at least one geographic location;
associating at least one symbol with the at least one geographic location wherein the associating is based at least in part on the at least one value associated with the at least one geographic location; and
generating output data for the first geographic area, the data configured to be processed by a remote computing device or another computing device, the data based at least in part on at least one of the at least one symbol, at least one of the at least one geographic location, and at least one of the at least one value associated with the at least one geographic location.

2. The method of claim 1, further comprising generating mapping data of the first geographic area wherein the at least one symbol is displayed at each of the associated at least one geographic location.

3. The method of claim 1, wherein the accessing of at least one value includes accessing at least one of a rental value, sales value, lease value, tax value, appraisal value, projected value, historical value, average value, weighted value, ratio value, profit value, or combination thereof.

4. The method of claim 1, wherein the generating includes generating output data, the data based at least in part on at least one of the at least one symbol, each symbol including a first visually identifying characteristic indicating at least one predetermined range of the at least one value and a second visually identifying characteristic indicating at least one predetermined subrange within the at least one predetermined range.

5. The method of claim 4, wherein the generating includes generating output data, the data based at least in part on at least one of the at least one symbol, the first identifying characteristic and the second identifying characteristic for each of the at least one symbol including a shape, a color, a pattern, or a combination thereof.

6. The method of claim 4, wherein the generating includes generating output data, the data based at least in part on at least one of the at least one symbol, each of the at least one symbol having an associated color and an associated shape.

7. The method of claim 6, wherein the generating includes generating output data, the data based at least in part on at least one of the at least one symbol, and a magnitude of the at least one predetermined range, the magnitude of the at least one predetermined subrange, or a combination thereof, varies among sets of symbols.

8. The method of claim 1, wherein the associating each of a plurality of symbols with each of a plurality of geographic locations further comprises:
associating a plurality of colors with a plurality of predetermined ranges of values associated with the plurality of geographic locations; and
associating a plurality of shapes with a plurality of predetermined subranges of values within each of the plurality of predetermined ranges of values associated with the plurality of geographic locations;
such that each associated symbol includes one of the plurality of colors and one of the plurality of shapes.

9. A computer system, comprising:
a processor configured to access data associated with a computer server having a value database comprising at least one value associated with at least one geographic location within the at least one requested geographic area, the processor or another processor further configured to access the at least one value and associate at least one symbol with each of the at least one geographic locations based at least in part on the at least one value, wherein the at least one symbol includes a first visually identifying characteristic indicating at least a predetermined range of the value and a second visually identifying characteristic indicating at least a predetermined subrange within the associated value range; and
a display configured to display map data of the at least one requested geographic area and symbols associated with geographic locations of the map data in response to a request for information regarding at least one geographic area received by the computer system.

10. The computer system of claim 9, wherein the at least one value is at least one of a rental value, sales value, lease value, tax value, appraisal value, projected value, historical value, average value, weighted value, ratio value, profit value, or combination thereof.

11. The computer system of claim 9, wherein the geographic location is identified by a street address, parcel number, tax identification number, navigation coordinates, or combinations thereof.

12. The computer system of claim 9, wherein the first identifying characteristic and the second identifying characteristic for each symbol includes a shape, a color, a pattern, or combination thereof.

13. The computer system of claim 9, wherein a magnitude of the at least a predetermined range, a magnitude of the at least a predetermined subrange, or a combination thereof, varies among any plurality of symbols based at least in part on a predetermined criterion.

14. A computer system, comprising:
a communication component configured to receive an indication from at least one remote computing device, the indication including a request for information for a first geographic area that includes at least one geographic location;
a processor configured to access data from the value database;
the processor or another processor configured to associate at least one symbol with each of the at least one geographic locations wherein the association is based at least in part upon at least one value associated with the at least one geographic location; and
an output device configured to generate output data for the first geographic area, the data configured to be processed by the at least one remote computing device or another computing device, the data based at least in part on at least one of the at least one symbol, at least one of the at least one geographic location, and at least one of the at least one value associated with the at least one geographic location.

15. The computer system of claim 14, wherein the at least one value is at least one of a rental value, sales value, lease value, tax value, appraisal value, projected value, historical value, average value, weighted value, ratio value, profit value, or combination thereof.

16. The computer system of claim 14, wherein the at least one geographic location is identified by a street address, parcel number, tax identification number, navigation coordinates, or combinations thereof.

17. The computer system of claim 14, wherein the first identifying characteristic and the second identifying characteristic for each of the at least one symbol include a shape, a color, a pattern, or a combination thereof.

18. The computer system of claim 14, wherein the at least one symbol associated with each of the at least one geographic locations, further includes a first visually identifying characteristic indicating at least a predetermined range of the value and a second visually identifying characteristic indicating at least a predetermined subrange within the associated value range and wherein a magnitude of the at least a predetermined range, a magnitude of the at least a predetermined subrange, or a combination thereof, varies among any plurality of symbols based at least in part on a predetermined criterion.

19. The computer system of claim 14, wherein the output device is configured to generate output data including mapping data for the first geographic area, the output data including the mapping data configured to be processed by the at least one remote computing device or another computing device.

20. The computer system of claim 19, wherein the at least one remote computing device is at least one mobile device.

* * * * *